United States Patent
Reid et al.

[11] Patent Number: 5,073,896
[45] Date of Patent: Dec. 17, 1991

[54] PURIFICATION OF LASER GASES

[75] Inventors: John Reid, Stittsville; Robert K. Brimacombe, Kanata; Edward S. Williams, Nepean, all of Canada

[73] Assignee: Lumonics Inc., Kanata, Canada

[21] Appl. No.: 687,028

[22] Filed: Apr. 18, 1991

[51] Int. Cl.⁵ ............................................. H01S 3/22
[52] U.S. Cl. ....................................... 372/59; 372/34; 62/51.1; 62/55.5
[58] Field of Search ................ 372/34, 59; 62/51.1, 62/95, 55.5, 514 R, 383

[56] References Cited

U.S. PATENT DOCUMENTS

| | | | |
|---|---|---|---|
| 4,601,040 | 7/1986 | Andrews et al. | 372/34 |
| 4,629,611 | 12/1986 | Fan | 372/59 |
| 4,674,092 | 6/1987 | Cannon | 372/59 |
| 4,740,982 | 4/1988 | Hakuta et al. | 372/59 |
| 4,977,749 | 12/1990 | Sercel | 62/51.1 |
| 5,001,721 | 3/1991 | Ludenig et al. | 372/59 |

Primary Examiner—Léon Scott, Jr.

[57] ABSTRACT

Purification of the gas mixture used in an excimer laser is carried out by cooling such mixture in a cryogenic trap to a temperature that is low enough that the lasting gas or gases (e.g. krypton, xenon, fluorine, hydrogen chloride) and the impurities are all substantially fully condensed. This temperature is nevertheless sufficiently high that the buffer gas (neon or helium or a mixture thereof) remains substantially all in gaseous form. The trap is then isolated from the laser vessel and the condensed gases therein are treated to remove at least the condensed impurities from the system. In a xenon chloride laser the condensed impurities can be effectively separated from the condensed laser gases by heating, i.e. differential distillation. After this has been done, the laser gases are returned to the laser vessel. In those instances in which such separation by differential distillation is not practicable, e.g. a krypton fluoride laser, some or all of the condensed lasing gas or gases is removed from the system together with the condensed impurities. Fresh charges of these lasing gases are then supplied to the laser vessel as required. The procedure is characterized by the fact that the buffer gas is retained and reused indefinitely. The method avoids the expense of having to periodically recharge the laser vessel with an entire fill of fresh buffer and lasing gases.

25 Claims, 6 Drawing Sheets

EFFECT OF IMPURITIES ON XeCl OUTPUT

PURIFICATION OF LASER GASES

FIELD OF THE INVENTION

This invention relates to the purification of gases used in lasers, especially excimer lasers.

1. Background of the Invention

The initial gas mixture in a rare gas halide laser consists of three components. Firstly, there is a buffer gas, usually neon (but sometimes helium or a mixture of neon and helium) that constitutes at least 90% of the total volume of the gas mixture. Then there is a rare gas, e.g. xenon, argon or krypton, which acts as a lasing gas and constitutes no more than about 10% of the total, and finally there is a halogen gas, fluorine or hydrogen chloride (which furnishes the chlorine), which also acts as a lasing gas and occupies less than 1% of the total volume. As the laser is used, impurity gases appear in the gas mixture by reason of the virtual impossibility of totally excluding all water vapour from the laser vessel and the highly reactive nature of the halogens and their inevitable reactions with the materials within the laser vessel and of which the laser vessel itself is made.

This contamination of the gas mixture by impurities results in a lowering of the efficiency of the laser due to absorption of the laser light or a degradation of the laser gas excitation processes. As a result, it is necessary either to replace all the gas in the laser relatively frequently with a fresh, uncontaminated "fill", or to subject the existing fill to a cleaning process. It is known, for example, to continuously bleed out a small portion of the mixture of gases in the laser vessel, remove impurities from such portion, and return the purified gases to the vessel.

One known method for purifying the contaminated gases is to cool them to a temperature cold enough to condense out the impurities, but not cold enough to condense the lasing and buffer gases. The temperature chosen will vary with the specific gases involved and the pressure at which the operation is carried out. Cryogenic liquid nitrogen trapping is a commonly employed method of achieving the temperature required, and a heating element may be used in those cases where the temperature of liquid nitrogen is too cold.

This differential condensation method works well with an argon fluoride laser, because the argon condenses at a temperature slightly lower than the impurities. However, it is more difficult to apply to a krypton fluoride laser, because of the closeness of the curves for vapour pressure versus temperature for krypton and one of the principal impurities, $CF_4$. In the case of a xenon chloride laser this differential condensing method is not as effective, because the xenon and HCl condense at a temperature substantially higher than CO (one of the main impurities).

2. Prior Art

A proposal to achieve improved temperature control by pressurising the liquid nitrogen in a Dewar vessel is disclosed in U.S. Pat. No. 4,977,749 issued Dec. 18, 1990 to J.P. Sercel. Specifically, the increased pressure raises the temperature of the liquid nitrogen from about $-196°$ C. to about $-170°$ C. The proposal claims in relation to a krypton fluoride laser that this latter temperature is "sufficient to freeze the volatile impurities but not so cold as to liquify the laser gas." While this comment is accurate in respect of the lasing gases and most of the impurities, it makes no provision for effectively removing the $CF_4$ impurity which has a vapour pressure at $-170°$ C. of about 3 Torr. If the pressure in the laser vessel is 4 atmospheres, a vapour pressure of 3 Torr is equivalent to a concentration of about 1000 ppm of $CF_4$ in the gas mixture, a concentration that has a seriously damaging effect on the efficiency of the laser. Hence, this proposed method, while eliminating some of the impurities, fails to solve the problem of separating out any impurity, such as $CF_4$, whose vapour pressure curve is too close to that of one or more of the lasing gases to enable differential condensation to be effectively carried out. In addition, it is impossible to separate out any impurity, such as CO in a XeCl laser, whose vapour pressure is higher than the laser gas at a given temperature.

Another proposal of a similar kind had previously been put forward in U.S. Pat. No. 4,601,040 issued July 15, 1986 to A.J. Andrews et al. This latter proposal also suggested using liquid nitrogen to obtain the necessary low temperature. However, it acknowledged that, while the standard differential condensation method is effective with an ArF laser, it cannot be used for purifying the gas mixtures in rare gas halide lasers generally, and in particular krypton and xenon lasers, because the vapour pressures of these two gases at the temperature of liquid nitrogen are too low to enable the laser to continue operating. To avoid this problem of excessive lowering of the vapour pressure of the lasing gas, this latter patent proposed a condenser that is operable over a range of temperatures, including temperatures warmer than the temperature ($-196°$ C.) of the liquid nitrogen refrigerant. For the same reason as explained above in relation to the Sercel proposal, the operation of this Andrews et al system at temperatures above the refrigerant temperature would avoid condensing the lasing gases and would achieve differential condensation of some of the impurities, but it could not achieve effective separation of all of them, and in particular the $CF_4$ impurity in a krypton fluoride laser and the CO impurity in a xenon chloride laser.

However, in addition, the Andrews et al proposal also referred to the possibility of operating the condensation chamber at the refrigerant temperature "to condense krypton or xenon from the system." This procedure was said to be useful because it "serves as a storage device for these gases and can be so used during laser head servicing." By "Laser head servicing", we assume that they refer to opening the laser vessel for repair or perhaps simply evacuating the entire contaminated gas mixture from the vessel and replacing it with a fresh fill. This latter Andrews et al proposal thus had the merit of saving the krypton or xenon gas. However, some contaminants would also be saved, such as $CF_4$ in a krypton fluoride laser. Furthermore, the technique could not save the buffer gas which had to be discarded on servicing. At the time of the Andrews et al proposal helium was the gas mainly used as the buffer gas and discarding the buffer gas was economically tolerable, because helium is relatively inexpensive. However, nowadays the increased performance that is being demanded from excimer lasers has required the use of neon (or a mixture of neon and helium in which the neon predominates) as the buffer gas. Neon is approximately 15-20 times more costly than helium, and, when it is borne in mind that over 90% of the total gas mixture is made up of the buffer gas, the cost of each fresh fill is of major significance. In addition, the bottles of fresh neon that are needed to accompany the laser are heavy and bulky.

Thus, as far as a krypton fluoride laser is concerned, neither the Sercel nor the Andrews et al proposal is ideal, because neither overcomes the basic dilemma facing the system designer, namely whether to accept the cost and other disadvantages of having to replace the entire gas fill frequently with a fresh fill or alternatively to accept the performance deterioration that results from only being able to condense out some of the impurities.

Essentially the same dilemma faces the designer of a xenon chloride laser. While the Andrews et al disclosure suggests that the condensation chamber can be used as a reservoir for liquid hydrogen chloride (which condenses out at about $-140°$ C.), and claims that "the greater part of the contaminant species are condensed out of the gas mixture," this statement fails to take into account one of the more common impurities encountered in a xenon chloride laser, namely CO, which requires temperatures significantly below $-200°$ C. to condense.

SUMMARY OF THE INVENTION

The object of the present invention is to provide a method that achieves the substantial elimination of even the most difficult to remove impurities, while at the same time avoiding the need to periodically discard and replace the buffer gas. The invention achieves this objective by supplementing the conventional method of differential condensation with a method in which the temperature of the gas mixture is taken to a level that is low enough to ensure substantially full condensation of all the impurities and of any laser gas present. After this step, there are basically two different subsequent procedures that can be followed.

In the case of a xenon chloride laser, the temperature will have been brought down to a value at least as low as $-230°$ C. in order to condense the CO, after which the condensed xenon, hydrogen chloride and impurity gases can be separated by a differential distillation process. As the temperature is slowly raised, the CO evaporates first and is discarded. The xenon and HCl evaporate next and are returned to the vessel for reuse. Finally, at a still higher temperature the other impurities, such as HF and $H_2O$ evaporate. These are discarded. It is important that the xenon is also saved, because xenon is very expensive (typically about 70 times more expensive than neon) and represents about 50% of the cost of the gas fill, even though a relatively small volume is required. Neon represents the remaining cost.

In the case of a krypton fluoride laser, all the condensed material will be discarded, because the krypton and the $CF_4$ vapour presures are too close to each other at a given temperature to be efficiently separated by a differential condensation or a differential distillation process. It is more economical to discard the contaminated krypton (typically about 5 times more expensive than neon) and replace it with fresh krypton. A relatively small volume of krypton is required and it represents only about 10% of the cost of a krypton fluoride gas fill, whereas 90% of the cost is due to neon.

The invention can thus be seen as a method of purifying a mixture of gases in the vessel of a laser, in which the mixture comprising at least one buffer gas, a rare lasing gas, a halogen lasing gas, and at least one impurity gas, the method comprising withdrawing the mixture from the vessel and subjecting the withdrawn mixture to a temperature that is sufficiently low to substantially condense all of the impurity gases (and any laser gas present), but high enough to leave the buffer gas substantially all in gaseous form. The condensed gases are then removed from the system, and the mixture is resupplied with any rare or other lasing gas necessary to enable the laser to operate again. Since the vessel remains sealed throughout, the laser now operates with the same buffer gas as was in the gas mixture prior to the purification steps, and which can thus be reused indefinitely.

In a more specific form, a preferred embodiment of the invention can be seen as providing a method of purifying the mixture of gases in the vessel of an excimer laser in two stages. The first stage is carried out during operation of the laser and comprises circulating the gas mixture through a cryogenic trap at a first temperature to condense some of the impurity gases from the mixture, while leaving the buffer and lasing gases at vapour pressure levels at which the laser continues to operate. The second stage comprises shutting down the laser, while continuing to circulate the gas mixture through the trap where it is now subjected to a second temperature that is lower than the first temperature and is sufficiently low to condense substantially all of the rare lasing gas and the remaining impurity gases, but high enough to leave the buffer gas substantially all in gaseous form. In a second part of this second stage the vessel is isolated from the trap to enable removal of the condensed impurity gases therefrom. Finally the trap is reconnected to the vessel and the gas mixture in the vessel is resupplied with any lasing gas or gases that are necessary to enable the laser to be restarted. It is important to note that the laser vessel is not evacuated and refilled with new gas in the usual manner. As a result, on restarting, it operates with the same buffer gas as was in the mixture prior to the purification process.

DETAILED DESCRIPTION OF THE PREFERRED EMBODIMENTS

Figure 1:
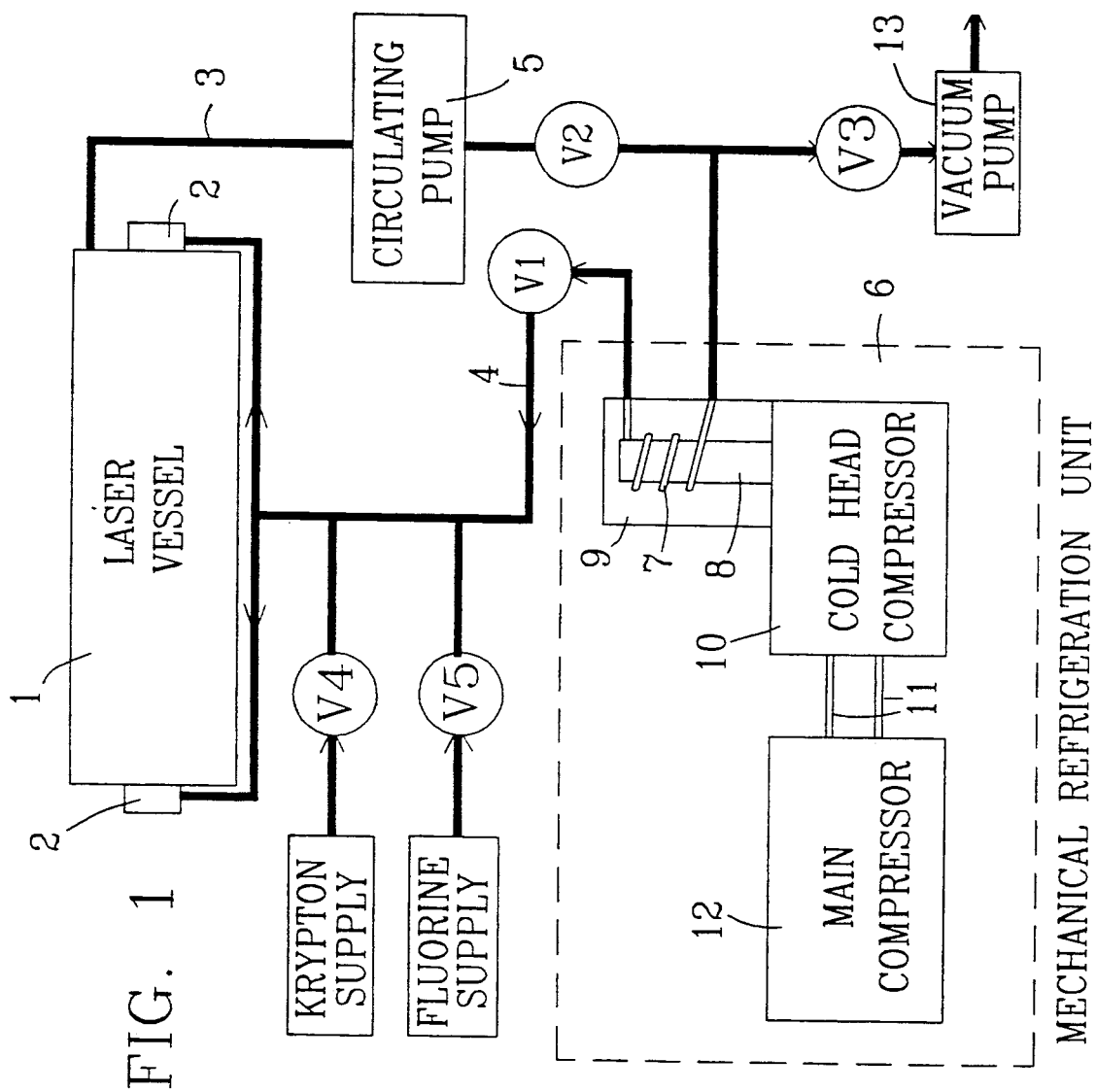
FIG. 1 is a schematic layout of a gas purification system for a KrF laser according to an embodiment of the ivnention.

FIG. 1 shows a laser vessel 1 from which the gas mixture can be bled in line 3 and continuously supplied by a circulating pump 5 through valve V2 to a cryogenic trap 7 mounted at the end of a cold finger 8 connected to a cold head compressor 10 and contained within an insulating jacket 9. The compressor 10 is supplied with helium refrigerant by lines 11 from a main compressor 12 The parts 7 to 12 together constitute a mechanical refrigeration unit 6.

The output from the cryogenic trap 7 is returned on line 4 through valve V1 to the laser vessel 1 at its optic ports 2. Valves V1 and V2 are isolating valves. The trap 7 can be connected through another isolating valve V3 to a vacuum pump 13 that discharges to an exhaust.

Figure 2:
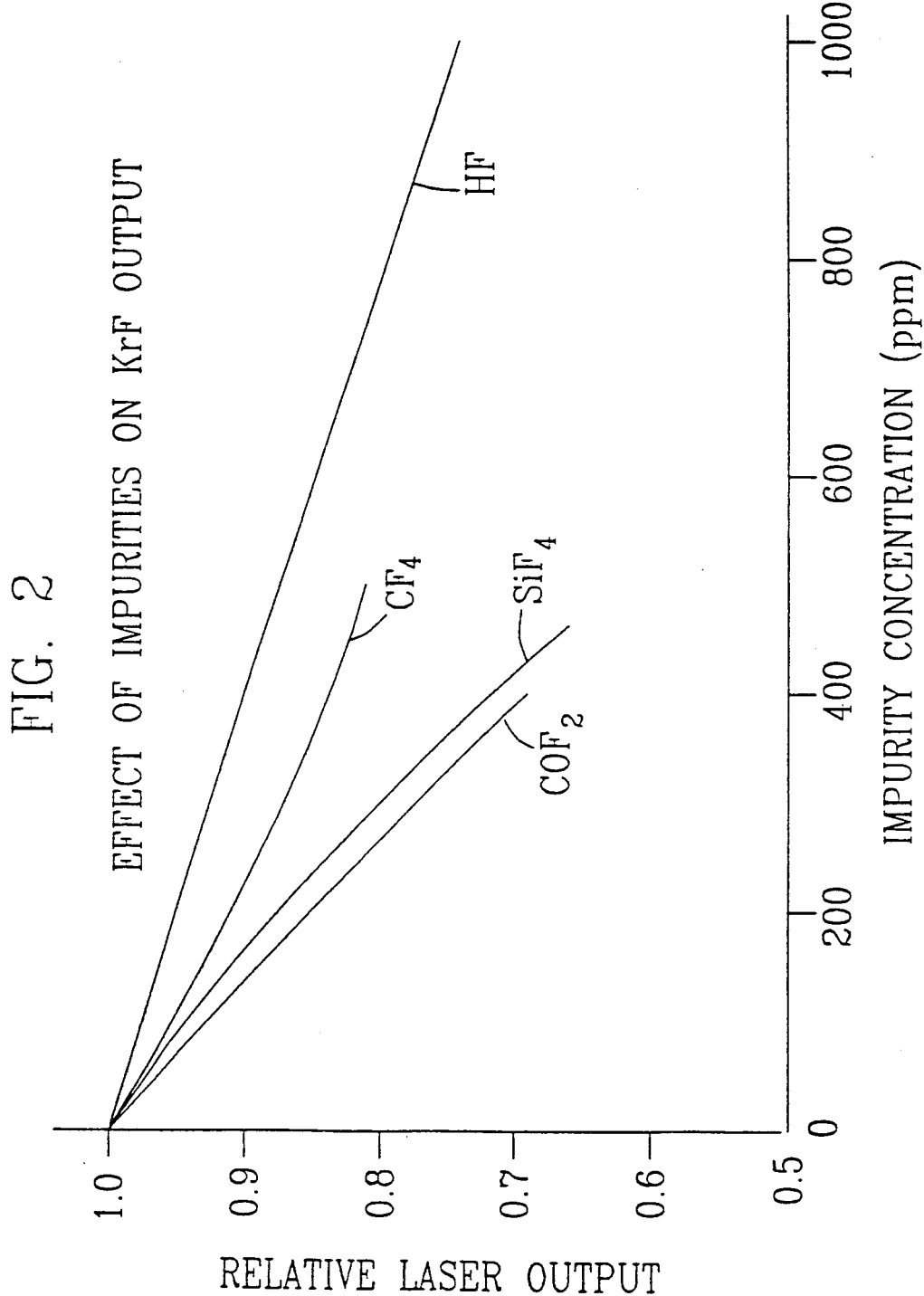
FIG. 2 shows the effects of impurities on the performance of this laser.

When the laser is a KrF laser, experience has proved that some or all of the impurities shown in FIG. 2 will likely begin to appear as the laser is used, resulting in deterioration of the laser output. Typically, this output will be down to about 80% of its initial value after about 20 million shots. In many applications, this number of shots represents only about 20 to 40 hours of operation.

Figure 3:
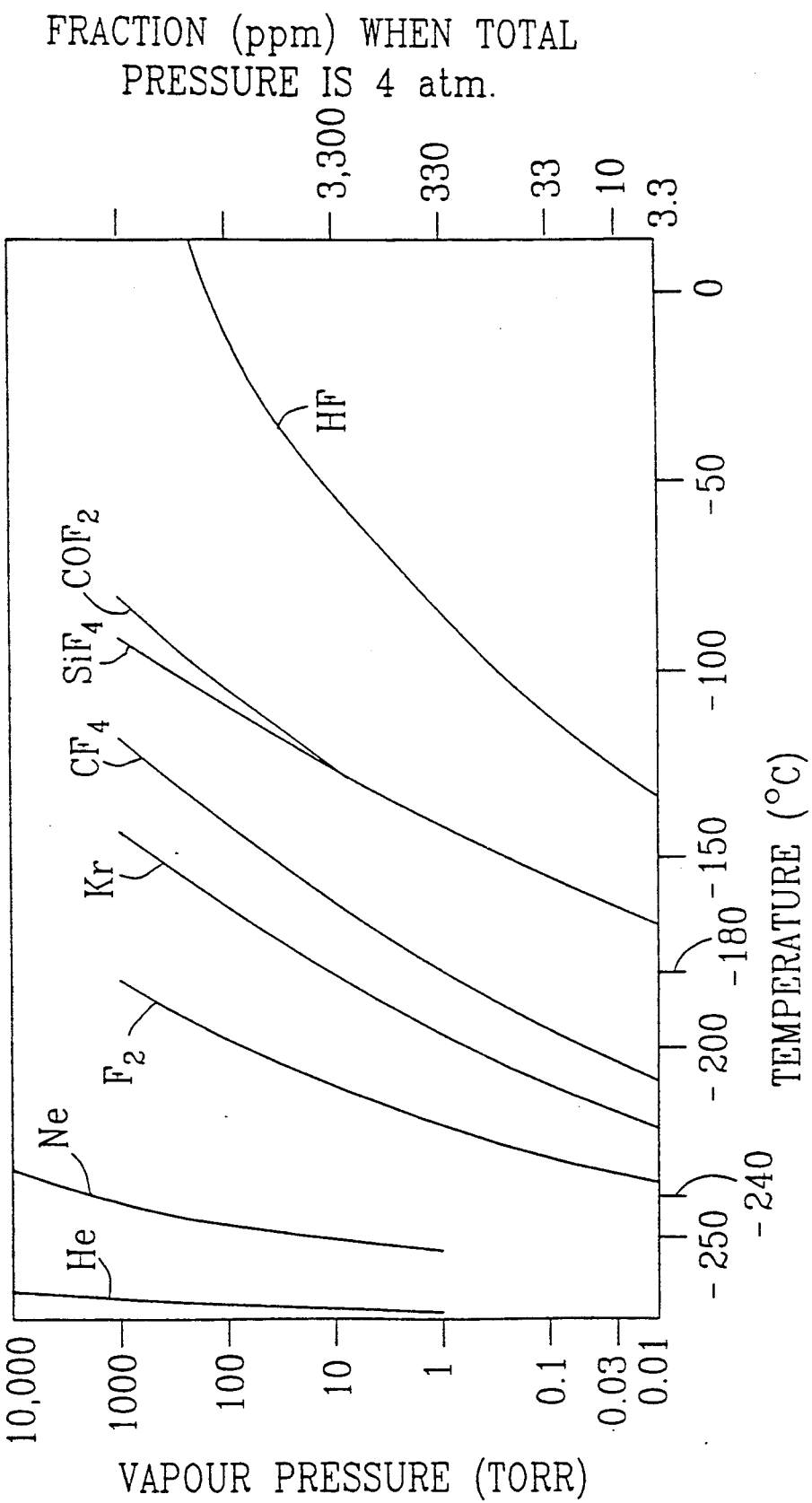
FIG. 3 shows curves a vapour pressure versus temperature for various gases in this laser.

FIG. 3 shows the vapour pressure versus temperature curves for the gases that will be extracted from the laser vessel by the pump 5. The buffer gas, usually all neon, but in some instances a mixture of mainly neon and some helium, will constitute at least 90% of the total of the gas mixture. The lasing gases, krypton and fluorine, will respectively occupy less than 10% and less than 1% of the total. The impurities shown in FIG. 2 will appear in varying amounts. These amounts are small compared to the volumes of the buffer and lasing gases, but, as FIG. 2 demonstrates, even such small amounts have a significant effect on laser performance.

As shown on the right hand side of FIG. 3, for a laser vessel pressure of 4 atmospheres a vapour pressure value of approximately 0.03 Torr is equivalent to a concentration of about 10 ppm. As can be seen from FIG. 2, at this very low concentration none of the impurities causes any significant deterioration in the laser performance, so that even the cumulative effect of a number of impurity gases each at such a low concentration can be tolerated. Attainment of such a low value, i.e. 0.03 Torr, for the vapour pressure of each impurity gas is thus ideal. There will be circumstances in which a greater impurity concentration for at least some of the impurity gases can be tolerated, e.g. as high as 33 ppm, which corresponds to a vapour pressure value of about 0.1 Torr.

As seen from FIG. 3, when the temperature is reduced to about $-180°$ C., all the impurities shown in FIG. 2 except $CF_4$, namely HF, $SiF_4$, and $COF_2$, will have been reduced to a vapour pressure well below 0.03 Torr, i.e. they will have been substantially fully condensed. If the temperature is further reduced to the range of about $-235°$ to $-240°$ C., the vapour pressures of the remaining impurity $CF_4$ and of the lasing gases Kr and Fz will similarly have been reduced below 0.03 Torr, i.e. will also have been substantially fully condensed. However, even at $-240°$ C. the buffer gas Ne (or Ne and He) will still have a vapour pressure substantially equal to that in the laser vessel, i.e. virtually none of the buffer gas will be condensed.

It should also be noted that, if a temperature in the region of $-210°$ C. is chosen, the vapour pressure of the $CF_4$ will have been reduced to 0.01 Torr, while that of the krypton will be about 0.1 Torr and that of the fluorine about 10 Torr. Even at a temperature as high as $-190°$ C. the vapour pressure of the $CF_4$ is about 0.2 Torr, which represents a concentration of only about 50 ppm, which is not ideal but may in some circumstances be tolerable.

Hence, if the most difficult impurity to condense, namely $CF_4$, is to be condensed to an acceptable (but not necessarily ideal) degree, i.e. a concentration of no more than about 50 ppm, while the buffer gas is not to be condensed at all, a temperature anywhere in the range of from $-190°$ to $-240°$ C. can be employed. However, a temperature in the range of $-210°$ to $-220°$ C. is preferred, since it results in almost total condensation of the $CF_4$ with relatively minimal condensation of the $F_2$.

In the light of these considerations, the procedure adopted in the preferred form of the present invention, as applied to a krypton fluoride laser, is in a first stage to eliminate the first group of impurities by means of an initial temperature reduction in the region of about $-170°$ to about $-180°$ C. while the laser is operating and the mixture of gases is continuously circulating. However, the $CF_4$ will continue to accumulate until it reaches an unacceptably high value, whereupon in a second stage the laser will be switched off and the trap 7 cooled further to a lower temperature within the range of $-190°$ to $-240°$ C., preferably $-210°$ to $-220°$ C. This lower temperature largely condenses the krypton, partly condenses the fluorine, and virtually totally condenses the $CF_4$, while leaving the neon (or helium) buffer gas still in gaseous form. The trap 7 is then isolated from the laser vessel 1 by the valves V1 and V2. The trap is warmed and the valve V3 is opened so that the vacuum pump 13 can extract all the condensate from the trap. After this has been done, the valves are returned to their former positions, which serves to isolate the vacuum pump 13 from the system and to reconnect the laser vessel 1 and the circulating pump 5 to the trap 7. A fresh charge of krypton can now be introduced into the laser vessel 1 through the valve V4, and the laser switched on again. Further fresh fluorine can be introduced into the vessel through the valve V5 on an as-needed basis which will be determined by observation of the laser operation. It will be appreciated that, if the temperature chosen for condensing all (or substantially all) of the $CF_4$ was at the warmer end of the range, say $-190°$ C., the fluorine vapour pressure would not have been reduced below its initial value of <300 Torr and hence all of the fluorine would have remained in gaseous form. In this case not much, if any, make-up fluorine would be necessary to operate the laser. On the other hand, if the lower end of the range ($-240°$ C.) had been chosen, in order to eliminate as much $CF_4$ as possible, substantially all the fluorine would also have been condensed and fresh fluorine would be needed to operate the laser. As far as the krypton concerned, however, even at $-190°$ C. its vapour pressure is down to less than about 5 Torr, so that a fresh charge of krypton will always be required on restarting the laser, regardless of where the selected temperature for the second stage is located in the $-190°$ to $-240°$ C. range.

While this procedure involves periodically discarding substantially all of the krypton and sometimes some of the fluorine, the quantities of these gases used are relatively small, and hence the cost is relatively low, in comparison with the neon which is fully retained and reused. The overall cost of the necessary make-up gases is thus noticeably lower than in the previously practised procedures in which the entire charge of gas mixture was replaced by a new fill, at least 90% of which was neon. In the method disclosed herein the neon is repeatedly purified and reused indefinitely.

Figure 6:
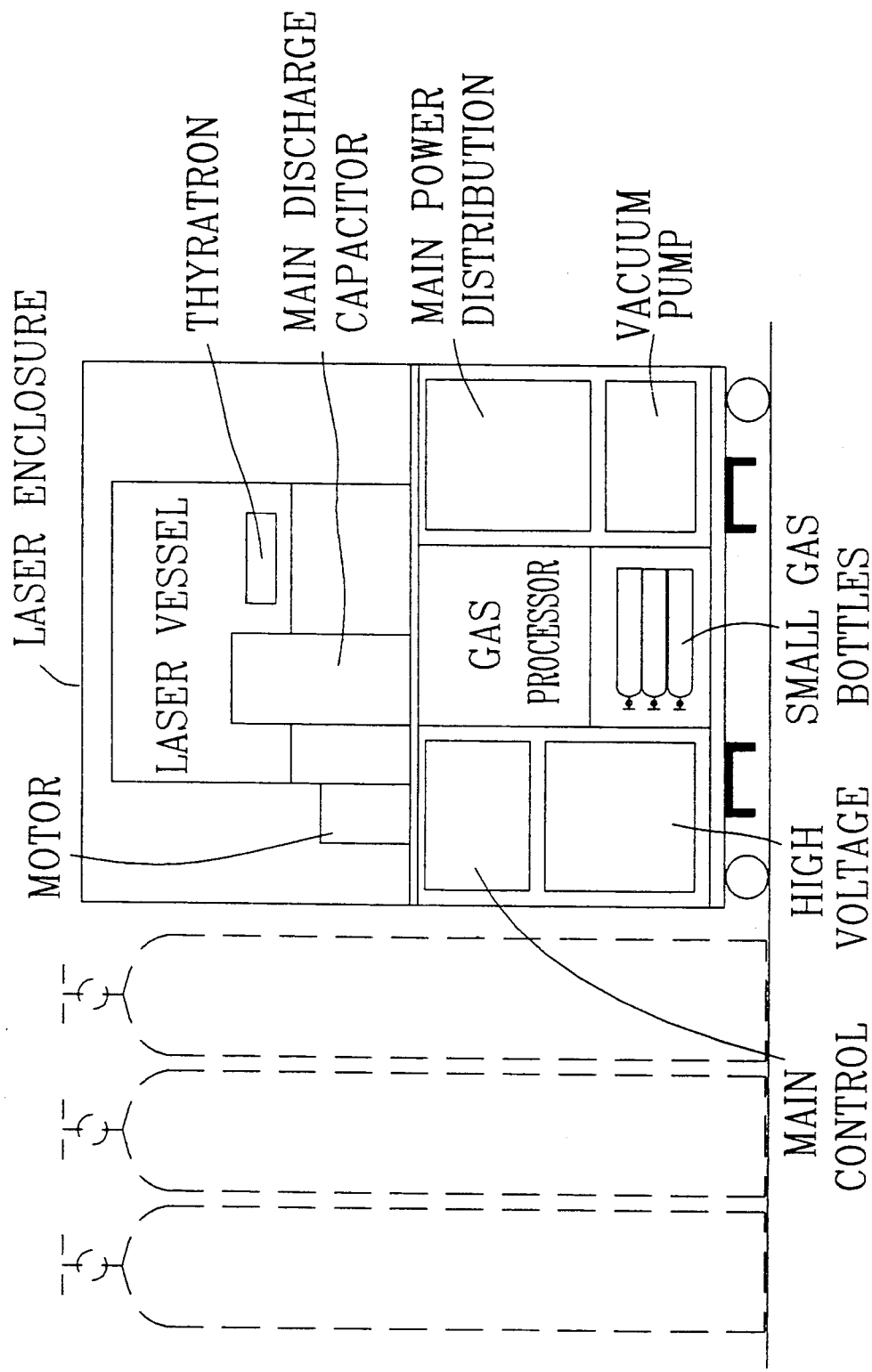
FIG. 6 illustrates a further advantage that can be achieved by the present invention.

Apart from cost, another practical advantage of the reuse of the neon resides in the fact that it enables the size of the accompanying gas cylinders to be much reduced. While it may be expedient to keep a small supply of neon on hand, in order to refill the laser if it is necessary to open the laser vessel for repair, a small bottle of neon containing a quantity of neon required for only a few complete fills will normally be sufficient for this purpose and moreover can be expected to last for a long time before requiring replacement. The need for the bulky and heavy cylinders of neon containing 25 to 50 complete fills that have traditionally stood beside excimer lasers can thus be largely eliminated. FIG. 6 shows a typical laser enclosure with internally mounted, small gas bottles for the make-up gases, and the elimination (broken lines) of the traditional large cylinders. The quantities of buffer gases in these small bottles can be sufficient for only a few fills of the laser vessel. Enough krypton for many recharges will be required, and the halogens ($F_2$ and HCl) are typically consumed by the laser and thus enough for many recharges is required. However, the quantities of these lasing gases needed per charge are relatively small compared to the quantity of buffer gas required per fill. This simplification enables the gas supplies to be transportable with the laser enclosure which is shown mounted on wheels. The section labelled Gas Processor in FIG. 6 will include the trap, the refrigerating unit and the valves shown in FIG. 1.

The facility of the present method to repeatedly purify the neon may have the additional advantage that the user can initially purchase a somewhat cheaper and lower grade of neon.

It is estimated that the downtime in laser operation resulting from the need to switch it off during the second stage of the purification process will typically be of the order of 30 minutes to 2 hours. The system will preferably be programmed to carry out this process automatically overnight when the laser would likely have been shut down in any event.

Figure 4:
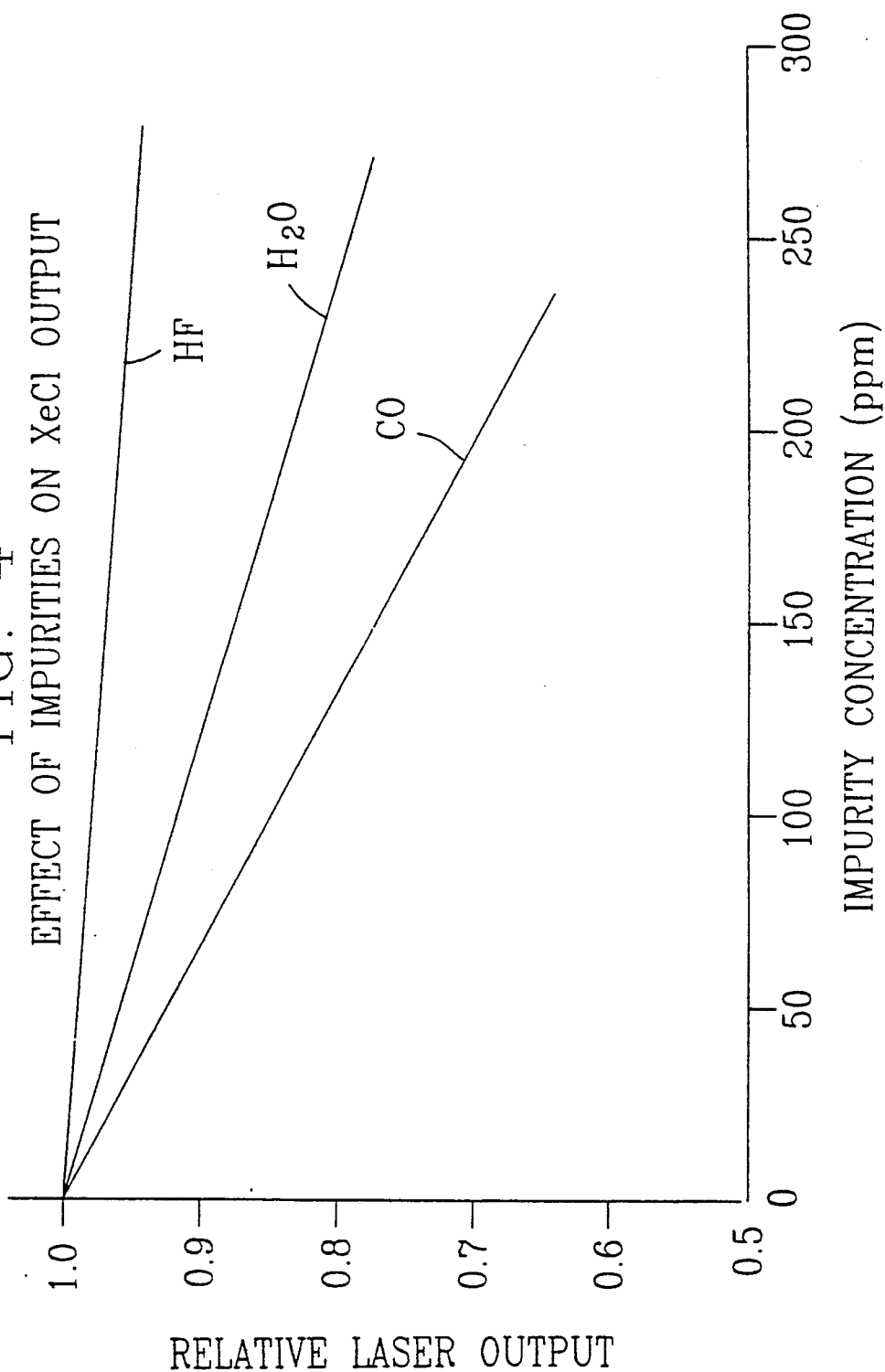
FIG. 4 corresponds to FIG. 2 for a XeCl laser.
Figure 5:
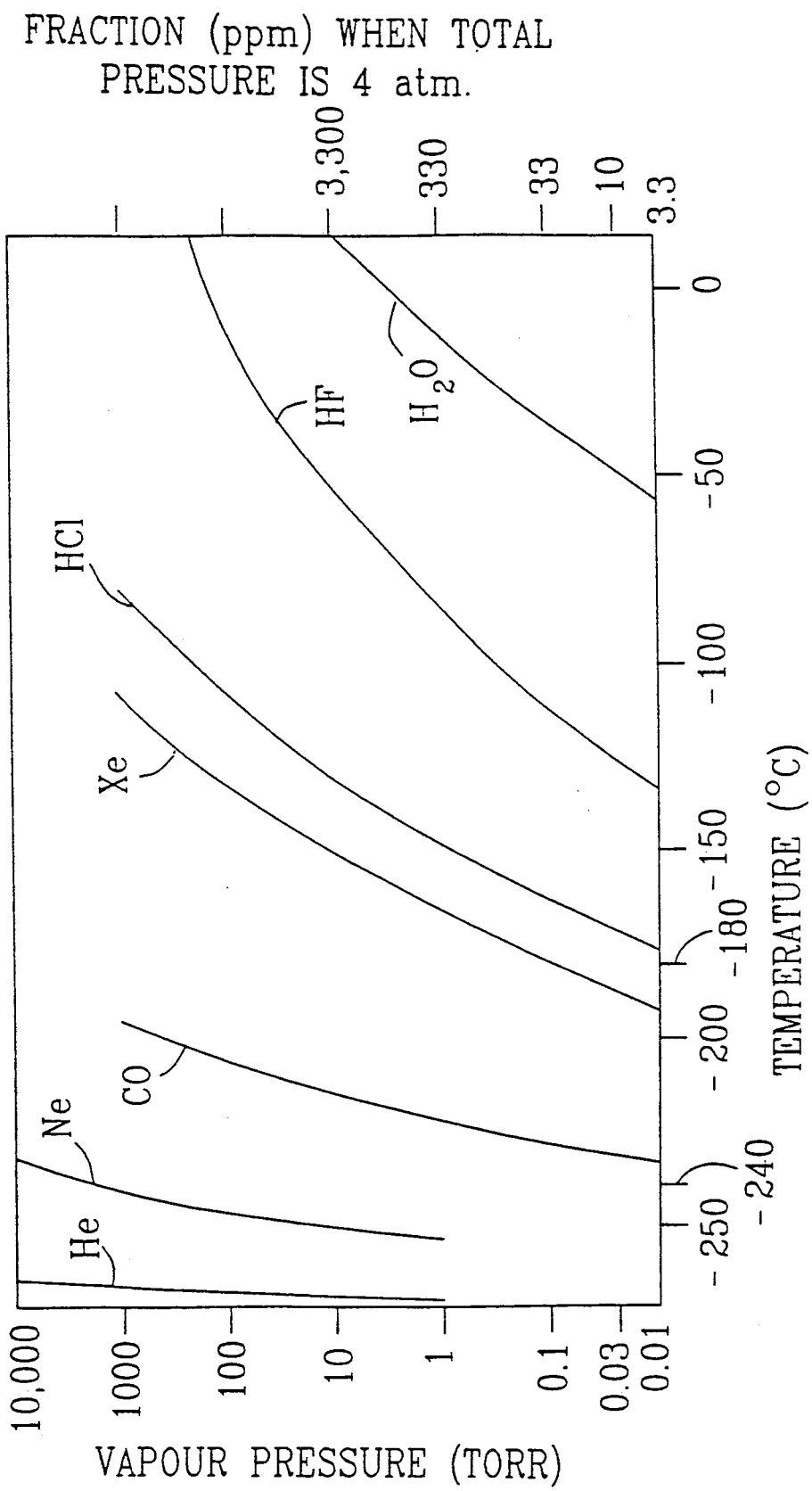
FIG. 5 corresponds to FIG. 3 for the XeCl laser.

If the laser is a XeCl laser, different impurities will appear, typical ones of these being shown in FIG. 4. When the system of FIG. 1 and the procedure explained above are adapted for a XeCl laser, some of the impurities shown in FIG. 4, e.g. HF and $H_2O$, can be removed continuously by the trap 7 in the first stage at a temperature in the range of $-140°$ to $-150°$ C. while the laser is operating. However, eventually the CO impurity will build up to a level at which it will be necessary to switch off the laser and proceed to the second stage of the purification process, at which time the temperature will be dropped to somewhere in the region of $-230°$ to $-240°$ C., preferably about $-235°$ C., to substantially entirely condense the CO without condensing the Ne buffer gas. At this temperature, both the lasing gases Xe and HCl will also be fully condensed.

The laser vessel 1 is then isolated from the trap 7 and the vacuum pump 13 connected to the trap by manipulation of valves V1-V3 as in the previous example. The trap 7 is then warmed under closely controlled conditions. Raising its temperature into the region $-190°$ to $-210°$ C. will evaporate the CO which will be exhausted by the pump 13. The Xe and HCl will remain condensed. After the CO has thus been exhausted from the system, the valves V1 to V3 will be returned to their original positions to reconnect the vessel to the trap. The trap will then be warmed further to its normal operating temperature of about $-140°$ to $-150°$ C., to evaporate the Xe and HCl, which are then recovered for reuse. Further warming of the trap after manipulating valves V1-V3 will exhaust the HF and $H_2O$ impurities. Since substantially no Xe or HCl has been removed from the system by this procedure, little or no makeup supplies of these gases will normally be necessary, except in the case of HCl which is consumed during laser operation. The same is true of the buffer gas which is reused indefinitely. In this embodiment of the invention, not only the Ne but also the Xe is reused. This represents a significant cost advantage, because Xe is a very expensive gas and represents about 50% of the cost of a gas fill.

XeF lasers are also known. In this case, since the impurity gases can be expected to be generally similar to those found in a KrF laser, essentially the same procedure as for a KrF laser will be followed, i.e. condensation of the Xe and $CF_4$ at around $-200°$ to $-210°$ C., and their subsequent elimination from the system. In this case some make-up Xe will be needed, but all or most of the $F_2$ can be kept in gaseous form and reused.

Also known are KrCl lasers. In this case the lasing gases are Kr and HCl, and the impurities can be expected to be generally similar to those in a XeCl laser. The procedure described above for a XeCl laser will preferably be followed, with cooling to condense the CO as well as the Kr and HCl, and subsequent warming to selectively evaporate the CO and retain all or most of the Kr and HCl.

While the two-stage procedure described above, i.e. a first stage conducted while the laser is operating, at a temperature above that required to condense the rare lasing gas, followed by a second stage conducted with the laser shut down at a lower temperature to condense the rare lasing gas, is preferred, it is possible to combine these stages into a single stage that is carried out with the laser shut down and at the lower temperature, since at this temperature all the impurities will be condensed. In other words, if the second stage is conducted often enough, the first stage can be eliminated as a separate stage. A single stage method of operation would enable a single cryogenic trap to be time shared by several lasers in a batch processing mode.

It should be mentioned that in the conventional method of operating a cryogenic trap it has been usual to isolate the trap periodically from the vessel, warm it and evacuate it to remove the condensed contaminants. This step serves simply to clean the trap, is performed on an as-needed basis and can be carried out either with the laser operating or shut down. The frequency of such trap cleaning is determined by the size of the trapping volume in the trap. When the present invention is practiced as a two-stage procedure as explained above, it would likely be convenient to employ the trap cleaning step before proceeding to the second stage of the method of the present invention. However, trap cleaning is not a necessary step between the two stages of the inventive two-stage procedure, as long as the trap volume is large enough to accommodate all of the contaminants from both stages.

While the use of a mechanical refrigeration unit is preferred because of the low temperatures it can generate and the close control over the operating temperatures that it affords, in the case of a KrF or a XeF laser, the gas mixture of which needs only to be cooled to a temperature in the region of $-190°$ to $-195°$ C. even in the second stage, a liquid nitrogen trap can be substituted. In addition, a liquid nitrogen device can be made to operate at temperatures approaching $-235°$ C. by evacuating the region directly above the cryogenic liquid. If this technique is used, a liquid nitrogen trap would also be suitable for the second stage processing in XeCl and KrCl lasers.

We claim:

1. In a method of purifying a mixture of gases in the vessel of a laser, said mixture comprising at least one buffer gas, a rare lasing gas, a halogen lasing gas, and at least one impurity gas, the steps of withdrawing the mixture from the vessel and subjecting the withdrawn mixture to a temperature sufficiently low to substantially condense all of the impurity gases, but high enough to leave the buffer gas substantially all in gaseous form, removing the condensed gases, and resupplying the mixture with any lasing gas required to enable the laser to operate, the vessel remaining sealed during the carrying out of the foregoing steps whereby the buffer gas that was in the mixture prior to said steps remains therein for reuse.

2. The method of claim 1, wherein said temperature is such as to substantially condense all of the rare lasing gas.

3. The method of claim 2, including the step of treating the removed condensed gases to separate the lasing gas or gases therein from the impurity gases therein.

4. The method of claim 3, wherein said step of resupplying the mixture with any required lasing gas comprises resupplying the mixture with the lasing gas or gases separated by said treating step.

5. The method of claim 2, including the step of discarding the removed condensed gases, and wherein said step of resupplying the mixture with any required lasing gas comprises resupplying said mixture with fresh lasing gas.

6. The method of claim 2, wherein said laser is a rare gas fluoride laser and said temperature is within the range of about −190° to about −240° C.

7. The method of claim 6, wherein said temperature is within the range of about −210° to about −220° C.

8. The method of claim 2, wherein said laser is a rare gas chloride laser and said temperature is within the range of about −230° to about −240° C.

9. A method of purifying a mixture of gases in a vessel of an excimer laser, said mixture comprising at least one buffer gas, a rare lasing gas, a halogen lasing gas and a plurality of impurity gases, said method comprising (a) a first stage comprising operating the laser and circulating said mixture through a cryogenic trap at a first temperature to condense some of said impurity gases from the mixture while leaving the buffer and lasing gases at vapour pressure levels at which the laser continues to operate; and (b) a second stage comprising shutting down the laser and continuing to circulate the mixture through the trap while subjecting the mixture in the trap to a second temperature lower than the first temperature and sufficiently low to condense substantially all the rare lasing gas and the remaining impurity gases but high enough to leave the buffer gas substantially all in gaseous form, then isolating the vessel from the trap to enable removal of the condensed impurity gases therefrom, and finally reconnecting the vessel to the trap and resupplying the gas mixture in the vessel with lasing gas or gases required to enable the laser to be restarted, the vessel remaining sealed throughout so that, on restarting, to operate with the same buffer gas as was in the gas mixture prior to said purification stages.

10. The method of claim 9, including between said first and second stages isolating the vessel from eh trap and warming and evacuating the trap to remove condensed contaminants therefrom.

11. A method of purifying a mixture of gases in a vessel of an excimer laser, said mixture comprising at least one buffer gas, a rare lasing gas, a halogen lasing gas and a plurality of impurity gases, said method comprising (a) during operation of the laser circulating said mixture through a cryogenic trap in which said mixture is exposed to a first temperature sufficiently low to substantially fully condense selected ones of said impurity gases and sufficiently high that the vapour pressures of the buffer and lasing gases are at levels at which the laser continues to operate;

(b) ceasing operation of the laser and continuing to circulate said mixture through the trap to expose said mixture to a second temperature lower than the first temperature, said second temperature being one at which the vapour pressures of at least the rare lasing gas and of each remaining impurity gas are so low that substantially all the rare lasing gas and the remaining impurity gases are condensed while the vapour pressure of the buffer gas is high enough that substantially none of the buffer gas is condensed:

(c) isolating the trap and the condensed gases therein from the laser vessel;

(d) removing at least the impurity gases from the trap;

(e) then reconnecting the trap to the laser vessel;

(f) reintroducing lasing gas or gases to the vessel; and (g) restarting the laser;

(h) including retaining the vessel sealed throughout the foregoing steps so that, on restarting, the laser operates with the same buffer gas as was in the gas mixture prior to said steps.

12. The method of claim 11, wherein the step of removing at least the impurity gases from the trap comprises removing all the condensed gases from the trap.

13. The method of claim 11, wherein the step of removing at least the impurity gases from the trap comprises raising the temperature of the trap sufficiently to evaporate impurity gases from the lasing gas or gases.

14. The method of claim 13, including the step after reconnecting the trap to the vessel of further raising the temperature of the trap to evaporate the lasing gas or gases to return them to the vessel in gaseous form.

15. The method of claim 14, including the subsequent step of again isolating the trap from the laser vessel and further raising the temperature of the trap to remove further impurity gases therefrom.

16. In a method of purifying a mixture of gases in the vessel of a rare gas fluoride laser, said mixture comprising, Ne, a rare gas selected from Kr and Xe, $F_2$, and impurity gases including $CF_4$, the steps of (a) while the laser is shut down circulating said mixture through a cryogenic trap to subject said mixture to a temperature at least as low as about −190° C. to condense substantially all the rare gas and the $CF_4$, but not lower than about −240° C. whereby (b) isolating the trap from the vessel and removing the condensed gases from the trap; and (c) reconnecting the tra to the vessel and supplying fresh rare gas in gaseous form to the vessel;

(d) the vessel remaining sealed throughout the foregoing steps whereby to retain the original Ne therein.

17. The method of claim 16, including supplying fresh $F_2$ in gaseous form to the vessel 18. The method of claim 16, including operating the laser and circulating said mixture through the trap to subject said mixture to a temperature in the region of about −170° C. to about −180° C. to substantially fully condense impurity gases other than $CF_4$, and removing such condensed gases from the trap.

19. In a method of purifying a mixture of gases in the vessel of a rare gas chloride laser, said mixture comprising Ne, a rare gas selected from Kr and Xe, HCl, and impurity gases including at least CO, the steps of (a) while the laser is shut down circulating said mixture through a cryogenic trap to subject said mixture to a temperature at least as low as about −230° C. to condense substantially all the rare gas, HCl and CO, but not lower than about −240° C. whereby to leave the Ne substantially all in gaseous form;

(b) isolating the trap from the vessel and warming the trap to a temperature in the region of about −190° to about −210° C. to evaporate and remove the CO therefrom; and (c) reconnecting the trap to the vessel and warming the trap to a temperature in the region of about −140° C. to about −150° C. to evaporate the rare gas and the HCl and return them in gaseous form to the vessel;

(d) the vessel remaining sealed throughout the foregoing steps whereby to retain the original Ne therein.

20. The method of claim 19, wherein the impurity gases include HF and $H_2O$, and including after step (c) again isolating the trap from the vessel and further warming the trap to a temperature sufficient to remove the HF and $H_2O$.

21. The method of claim 19, including operating the laser and circulating said mixture through the trap to subject said mixture to a temperature in the range of about −140° C. to about −150° C. to condense substantially all impurity gases other than CO, and removing such condensed gases from the trap.

22. An assembly of
(a) an excimer laser including a laser vessel;
(b) a cryogenic trap;
(c) means for cooling said trap to a temperature at least as low as −190° C.;
(d) means for circulating a gas mixture from the vessel through said trap;
(e) gas storage means for supplying fresh gas to said vessel; and
(f) an enclosure including means for mounting the laser, the trap, the cooling means, the circulating means and the gas storage means in the enclosure.

23. An assembly according to claim 22, wherein the cooling means is a mechanical refrigeration unit capable of cooling the trap to a temperature at least as low as −200° C.

24. An assembly according to claim 22, wherein the gas storage means includes means for storing: a small make-up quantity of a buffer gas that forms a major part of the gas mixture, said quantity being sufficient for only a few fills of the vessel.

25. An enclosure and an excimer laser assembly mounted therein, said laser assembly including gas storage means for supplying fresh make-up gases to a vessel of the laser, said gas storage means being characterized by being so small in comparison with the size of the vessel as to contain a quantity of said gases sufficient for only a few fills of said vessel, and further characterized by being mounted in said enclosure to be transportable therewith.

* * * * *